United States Patent
Drake et al.

(10) Patent No.: US 8,774,609 B2
(45) Date of Patent: Jul. 8, 2014

(54) SYSTEM AND METHOD FOR PROVIDING TIME-ADAPTED VIDEO CONTENT

(75) Inventors: Edward C. Drake, Stevenson Ranch, CA (US); Arnaud Robert, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1058 days.

(21) Appl. No.: 12/454,524

(22) Filed: May 18, 2009

(65) Prior Publication Data

US 2010/0290761 A1    Nov. 18, 2010

(51) Int. Cl.
| | | |
|---|---|---|
| *H04N 5/91* | (2006.01) |
| *H04N 5/45* | (2011.01) |
| *H04N 7/10* | (2006.01) |
| *H04N 21/475* | (2011.01) |
| *H04N 21/432* | (2011.01) |
| *H04N 21/258* | (2011.01) |
| *H04N 7/16* | (2011.01) |
| *H04N 21/45* | (2011.01) |
| *H04N 21/845* | (2011.01) |
| *G11B 27/10* | (2006.01) |
| *H04N 21/488* | (2011.01) |
| *G11B 27/00* | (2006.01) |
| *H04N 21/41* | (2011.01) |
| *H04N 21/262* | (2011.01) |
| *H04N 21/454* | (2011.01) |
| *H04N 21/44* | (2011.01) |
| *H04N 5/783* | (2006.01) |
| *H04N 21/81* | (2011.01) |
| *H04N 5/765* | (2006.01) |
| *H04N 5/85* | (2006.01) |
| *H04N 5/907* | (2006.01) |
| *H04N 5/775* | (2006.01) |
| *H04N 9/82* | (2006.01) |

(52) U.S. Cl.
CPC .......... *H04N 7/163* (2013.01); *H04N 21/4755* (2013.01); *H04N 5/765* (2013.01); *H04N 21/4325* (2013.01); *H04N 21/25891* (2013.01); *H04N 21/4532* (2013.01); *H04N 21/8456* (2013.01); *G11B 27/105* (2013.01); *H04N 21/4884* (2013.01); *G11B 27/005* (2013.01); *H04N 5/85* (2013.01); *H04N 21/4135* (2013.01); *H04N 5/907* (2013.01); *H04N 21/26258* (2013.01); *H04N 21/4542* (2013.01); *H04N 21/44016* (2013.01); *H04N 5/775* (2013.01); *H04N 9/8227* (2013.01); *H04N 5/783* (2013.01); *H04N 21/812* (2013.01); *H04N 9/8205* (2013.01)
USPC .............................. 386/350; 348/565; 725/32

(58) Field of Classification Search
USPC ......................................................... 386/343
See application file for complete search history.

(56) References Cited

U.S. PATENT DOCUMENTS

| | | | |
|---|---|---|---|
| 6,199,076 B1 | 3/2001 | Logan et al. | |
| 6,909,837 B1 | 6/2005 | Unger | |
| 7,418,191 B2 | 8/2008 | Unger | |
| 7,440,674 B2 | 10/2008 | Plotnick et al. | |
| 7,634,785 B2 * | 12/2009 | Smith | 725/34 |
| 8,079,052 B2 * | 12/2011 | Chen et al. | 725/88 |
| 2002/0144262 A1 * | 10/2002 | Plotnick et al. | 725/32 |
| 2003/0037068 A1 | 2/2003 | Thomas | |
| 2003/0037330 A1 * | 2/2003 | Makofka | 725/32 |
| 2003/0154128 A1 | 8/2003 | Liga | |
| 2004/0034874 A1 * | 2/2004 | Hord et al. | 725/136 |
| 2005/0076359 A1 | 4/2005 | Pierson | |
| 2005/0240955 A1 * | 10/2005 | Hudson | 725/9 |
| 2006/0218617 A1 | 9/2006 | Bradstreet et al. | |
| 2008/0092159 A1 | 4/2008 | Dmitriev et al. | |
| 2008/0155585 A1 * | 6/2008 | Craner et al. | 725/32 |

FOREIGN PATENT DOCUMENTS

WO    WO 99/31879    6/1999

OTHER PUBLICATIONS

Graham, et al., *Ads to pop up when TiVo users scan past commercials*, <http://www.usatoday.com/tech/products/gear/2004-11-18-tivo-ads_x.htm> (Posted on Nov. 18, 2004).

\* cited by examiner

*Primary Examiner* — Hung Dang
*Assistant Examiner* — Sunghyoun Park
(74) *Attorney, Agent, or Firm* — Farjami & Farjami LLP (57) ABSTRACT

There is provided a system and method for time-adapted video content during trick mode playback. There is provided a method of providing a plurality of pre-produced alternative contents for use by a playback device in conjunction with rendering of a content, comprising determining a current playback speed of the playback device, comparing the current playback speed with a real-time playback speed of the playback device that is for viewing the content, selecting one of the plurality of pre-produced alternative contents based on the current playback speed in response to the comparing of the current playback speed with the real-time playback speed, and rendering the one of the plurality of pre-produced alternative contents in place of the rendering of the content. In this manner, more relevant and intelligible video contents can be provided for the user during trick mode playback.

20 Claims, 4 Drawing Sheets

SYSTEM AND METHOD FOR PROVIDING TIME-ADAPTED VIDEO CONTENT

BACKGROUND OF THE INVENTION

1. Field of the Invention

The present invention relates generally to media communications. More particularly, the present invention relates to presentation of media content.

2. Background Art

To watch their favorite video programs in the past, consumers needed to read up on broadcast schedules and make room in their schedules to be at the television, or otherwise needed to program their unwieldy videocassette recorder, oftentimes an obtuse and confusing process. Today, however, consumers are largely free from the constraints of broadcast schedules by using media devices such as digital video recorders (DVRs), video streaming set-top boxes, media enabled videogame consoles, and home theater personal computers (HTPCs). Through user-friendly and convenient features such as on-screen programming guides, time shifting, and on-demand Internet streaming, these smart media devices provide new ways to access video media at the convenience of the consumer. For example, with the push of a button, an entire season of the consumer's favorite broadcast program can be automatically recorded for future viewing at any convenient time.

Unfortunately, many of these media devices also feature functionality that undermine the financial foundations for providing high quality programming at reasonable or zero cost for the consumer. More specifically, these media devices may often be equipped with functionality which automatically or manually bypass commercials and other forms of advertising. For example, media devices may be equipped with various trick mode playback features such as fast forwarding, frame skipping, and time shifting, which can be used to shorten or skip advertisements.

However, advertising often remains the only acceptable financing model between consumers desiring low cost yet high quality programming and content producers providing that high quality programming under budget constraints. This financing model is severely undermined when audiences never see the advertisements that advertisers have duly paid for. To facilitate the continued financial viability of sponsored video programming accessible to the widest viewing audience, new advertising solutions must be formulated to fairly compensate advertiser sponsorship and at the same time be acceptable to consumers who have grown accustomed to DVR functionalities.

Accordingly, there is a need to overcome the drawbacks and deficiencies in the art by providing a way to present advertisements to audiences despite the built-in functionalities of modern media devices.

SUMMARY OF THE INVENTION

There are provided systems and methods for time-adapted video content during trick mode playback, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for providing time-adapted video content during trick mode playback. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
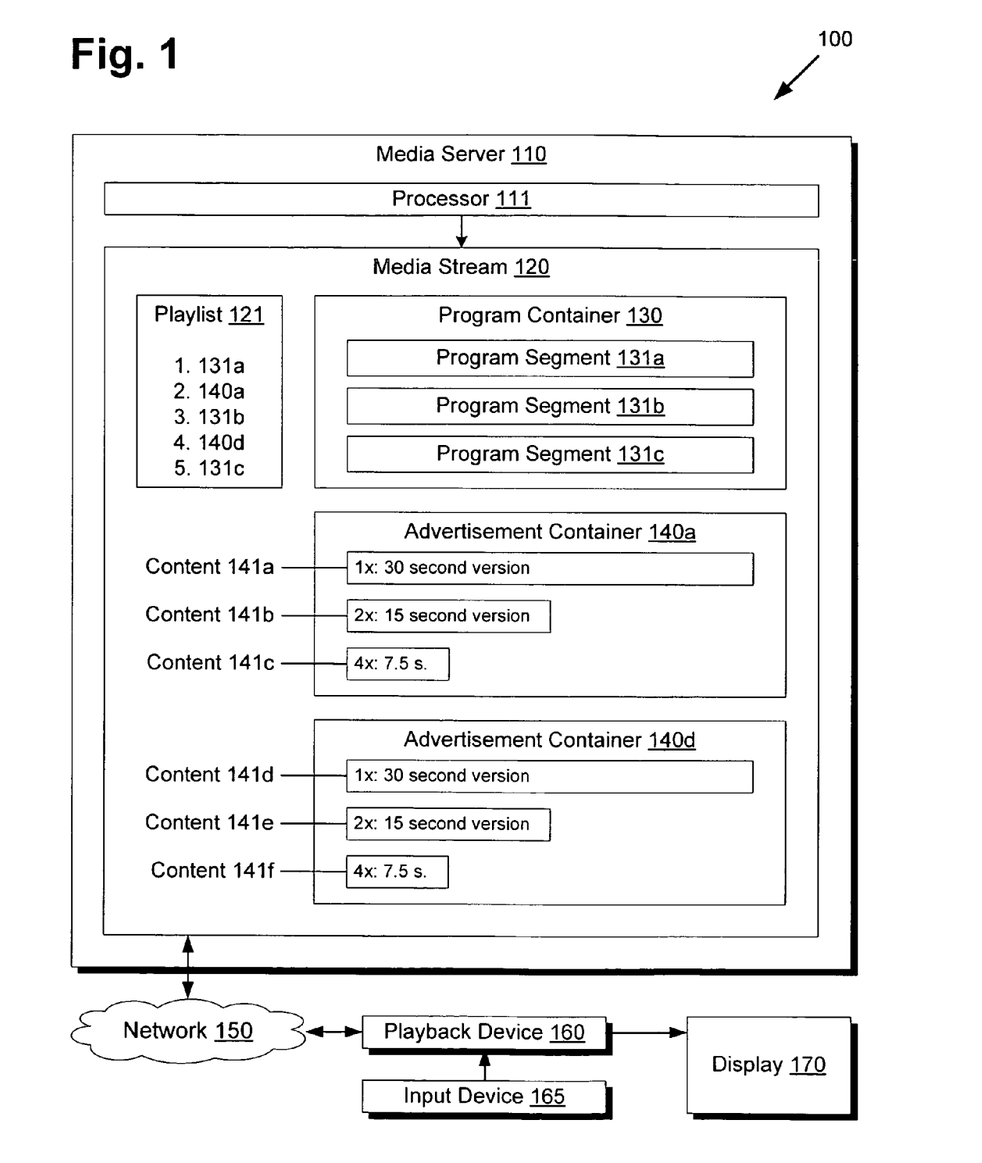
FIG. 1 presents a system for providing time-adapted video content during trick mode playback, according to one embodiment of the present invention.

FIG. 1 presents a system for providing time-adapted video content during trick mode playback, according to one embodiment of the present invention. Environment 100 of FIG. 1 includes media server 110, network 150, playback device 160, input device 165, and display 170. Media server 110 includes processor 111 and media stream 120. Media stream 120 includes playlist 121, program container 130, advertisement container 140a, and advertisement container 140d. Program container 130 includes program segments 131a-131c. Advertisement container 140a contains contents 141a-141c. Advertisement container 140d contains contents 141d-141f.

Playback device 160 may comprise, for example, a digital video recorder (DVR), a video streaming set-top box, a videogame console with video streaming support, a personal computer, a mobile device such as a smartphone or portable game device, or any other electronic device capable of video playback. By responding to user input from input device 165, playback device 160 can access media server 110 via network 150 to initiate a streaming video session. Input device 165 may comprise, for example, a remote control, a game-pad, a touch sensitive display, a keyboard and mouse, a pen tablet, or any other device capable of reading user input. Network 150 may comprise, for example, a publicly accessible network such as the Internet.

Processor 111 of media server 110 may then generate media stream 120 for delivery to playback device 160. Playlist 121 provides an ordered list of tracks to stream, whereas program container 130 and advertisement containers 140a and 140d provide the actual containers of video content for streaming. As shown in FIG. 1, each container may store several separate tracks of independent video content. Program container 130 contains three segments, program segments 131a-131c, which might comprise three parts of a longer program. As shown by playlist 121, these three parts are to be played sequentially as tracks 1, 3, and 5, with commercial breaks interspersed from advertisement containers 140a and 140d as tracks 2 and 4. Each advertisement container also contains three alternative contents of varying lengths, with contents 141a and 141d containing 30 second advertisements, contents 141b and 141e containing alternative 15 second advertisements, and contents 141c and 141f containing alternative 7.5 second advertisements. Each of these alternative contents may be specially pre-produced for their respective time durations, using independent or shared video content. Playback device 160 may then choose the most appropriate time-adapted content from each advertisement container, as discussed further below.

Although FIG. 1 shows a network centric client-server streaming model, alternative embodiments may use other content delivery models. For example, playback device 160 could comprise a DVR downloading or recording media for future playback from a local storage source such as flash storage, a hard disk drive, or optical media. Playback device 160 could also comprise a player for physical discs such as a DVD player or a Blu-ray player, where network connectivity is not strictly necessary. Also, rather than retrieving content from network based media server 110, playback device 160 may alternatively retrieve video streams from traditional broadcast sources such as cable television, satellite, or over the air broadcasts, or physical media including optical media, hard drive, or other data storage medium. In any case, once playback device 160 has access to media stream 120 whether locally or through a network source, such as a storage source, a server or broadcast source, accessible through network 150, display 170 may then be utilized to show images for user viewing. Additionally, display 170 may include integrated speakers for concurrent audio output.

Although media server 110 handles both advertisement containers and program containers in FIG. 1, alternative embodiments may use multiple servers for different tasks. For example, dedicated advertisement servers may focus of choosing and providing advertising containers, dedicated media servers may focus on storing and providing program containers, and dedicated network service servers may focus on network streaming, playlist assembly, and user interface presentation. In this case, the alternative contents contained within advertisement container 140a and 140d may be retrieved from different sources. Additionally, multiple redundant servers might be utilized to provide load balancing, improved uptime, and faster network responses to a wider geographic area. Moreover, advertising is only one particular embodiment, and other alternative or supplemental contents besides advertisements may also utilize time-adapted videos for presentation during trick-mode playback.

Figure 2:
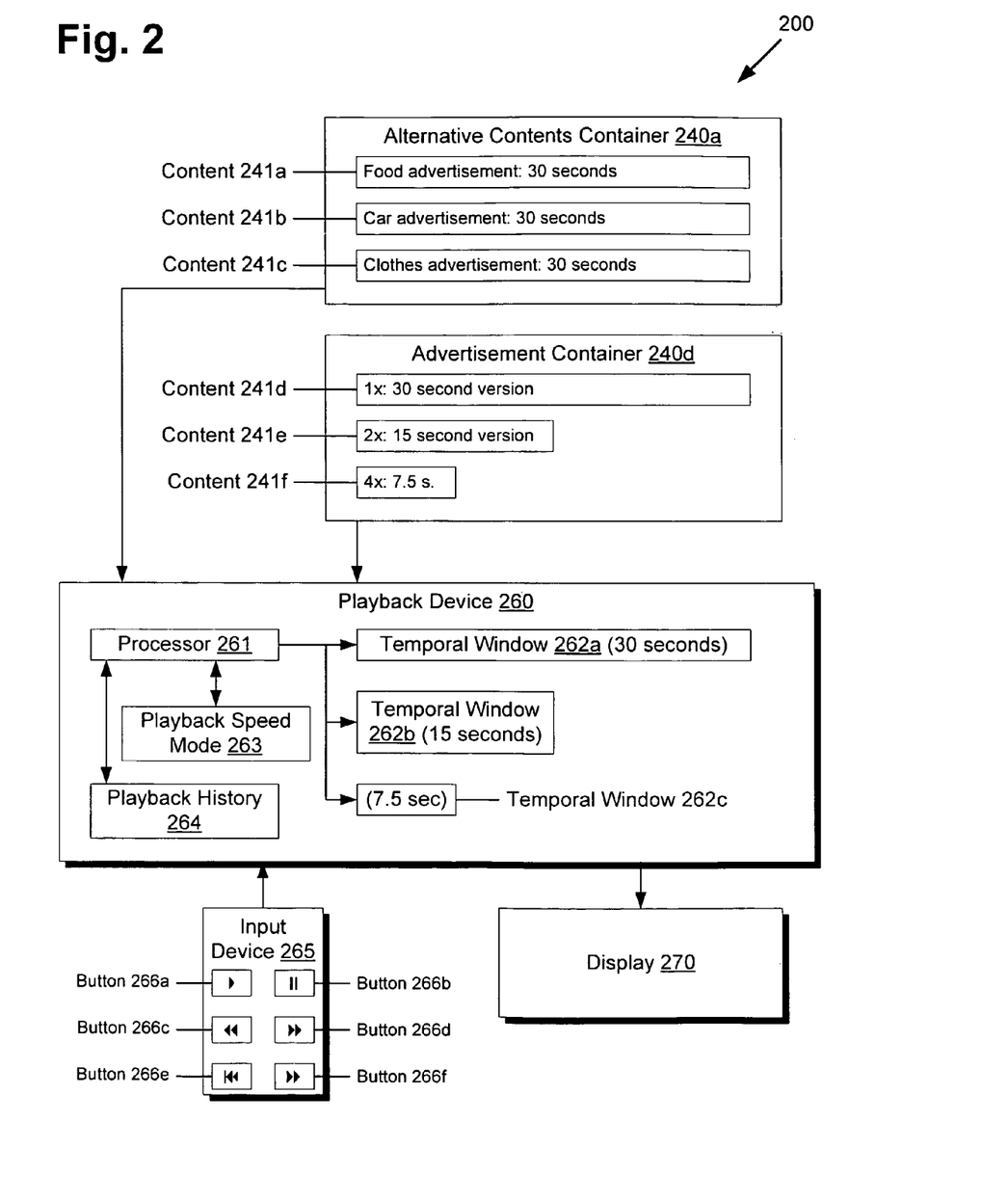
FIG. 2 presents a system for providing time-adapted video content for temporal windows selected through an input device, according to one embodiment of the present invention.

FIG. 2 presents a system for providing time-adapted video content for temporal windows selected through an input device, according to one embodiment of the present invention. Environment 200 of FIG. 2 includes alternative contents container 240a, advertisement container 240d, playback device 260, input device 265, and display 270. Alternative contents container 240a includes contents 241a-241c. Advertisement container 240d contains contents 241d-241f. Playback device 260 includes processor 261, temporal windows 262a-262c, playback speed mode 263, and playback history 264. Input device 265 includes buttons 266a-266f. With regards to FIG. 2, it should be noted that playback device 260 corresponds to playback device 160 of FIG. 1, that input device 265 corresponds to input device 165, and that display 270 corresponds to display 170.

As previously discussed, a network storage source such as media server 110 of FIG. 1 or a locally accessible storage source may provide storage for alternative contents container 240a and advertisement container 240d in FIG. 2. A user can use input device 265 to control playback speed mode 263, which in turn affects the selection of contents 241a-241f from alternative contents container 240a and advertisement container 240d for viewing on display 270. Playback speed mode 263 may contain at least two components, including a playback mode and a playback speed. Playback mode may contain, for example, a normal real-time mode, a pause mode, a fast-forward mode, and a rewind mode, which are modes typically found on most playback devices for media navigation. Playback modes other than the normal real-time mode may also be referred to as trick mode playback. These playback modes may be combined with various playback speeds to comprise playback speed mode 263. While the normal real-time mode may be limited to selecting from a 1x real-time speed, trick mode playback might select from a wide range of playback speeds depending on the configuration of playback device 260.

For example, playback device 260 may provide for a slow-motion 0.5x real-time speed, a normal 1x real-time speed, a fast 2x speed, and a double-fast 4x speed. Combining a selection of the fast-forward mode or the rewind mode with these provided playback speeds, playback device 260 can provide a wide range of playback speed modes for playback speed mode 263, including double fast-rewind 4x real-time speed, fast rewind 2x real-time speed, real-time rewind 1x real-time speed, slow-motion rewind 0.5x real-time speed, slow-motion 0.5x real-time speed, normal 1x real-time speed, fast-forward 2x real-time speed, and double fast-forward 4x real-time speed. This wide range of reverse or rewind and forward playback speed modes provides users with flexible options for content navigation.

Once a particular playback speed mode 263 is selected, it may then restrict the length of an available temporal window. For example, in normal real-time playback mode, temporal window 262a, or 30 seconds, may be the maximum time available for showing an advertisement. This 30 seconds time length may be any appropriate time length as determined by certain guidelines. However, once this time length is decided, temporal windows 262b-262c derive their time lengths from the time length used for temporal window 262a. For example, in fast-forward or 2x real-time playback mode, temporal window 262b may be selected with a time length ½ or one half of temporal window 262a or 15 seconds. In double fast-forward or 4x real-time playback mode, temporal window 262c may be selected with a time length ¼ or one fourth of temporal window 262a or 7.5 seconds. This temporal window represents the amount of actual time available until playback device 260 needs to move to the next content segment, which may be the resumption of video programming, the initiating of another advertisement, or the resumption of the previously replaced content.

For example, assuming that playback speed mode 263 is normal 1x real-time speed, temporal window 262a may be selected and therefore content 241d shall be selected of the three available alternatives from advertisement container 240d. If playback speed mode 263 is fast-forward 2x real-time speed, then temporal window 262b may be selected and therefore content 241e shall be selected of the three available alternatives from advertisement container 240d. If playback speed mode 263 is double fast-forward 4x real-time speed, then temporal window 262c may be selected and therefore content 241f shall be selected of the three available alternatives from advertisement container 240d. Although the examples given have focused on the fast-forward situation, this logic could equally apply to a rewinding situation. In a rewinding situation, instead of perceiving the usual unintelligible reverse playing video, a user might be presented with an alternative advertisement or some other content playing at real-time 1x speed instead, with a temporal window selected based on the speed of rewinding. In this manner, users can at least watch intelligible video contents at real-time playback speeds while rewinding, and advertisers can gain more opportunities for advertisement exposure.

As visually shown by the length of the content boxes in advertisement container 240d and temporal windows 262a-262c, the lengths of the alternative versions provided in advertisement container 240d are matched to temporal windows 262a-262c corresponding to the various playback speed modes of playback device 260. This can also be expressed as a relationship where a speed ratio based on the playback speed mode divided by the real-time speed is equal to a length of time ratio based on a length of time for a temporal window corresponding to a real-time speed divided by a length of time for a selected content. For example, if playback speed mode 263 is set to fast-forward 2x real-time speed, then the speed ratio is 2:1 and the length of time ratio is 30:x, where x is the length of time or alternative temporal window for a selected content. Solving the ratio leads to x=15, so therefore content 241e should be selected when playback speed mode 263 is set to fast-forward 2x real-time speed. In alternative embodiments, this exact ratio may not be strictly adhered to, and a less stringent matching model based on relative speeds and a best fit for available temporal windows based on lengths of time may be utilized.

At this point, it may be useful to distinguish that regardless of the temporal window available or the time length of a particular content being selected for display due to playback speed mode 263, a user watching display 270 will still perceive the resulting video played back at a normal 1x real-time speed. If playback device 260 supports the ability to output from contents 241d-241f of advertisement container 240d based on playback speed mode 263 but still outputting at a playback speed of 1x real-time speed on display 270, then playback device 260 can simply select and playback the appropriate content, where all contents are recorded at standard real-time framerates. This standard 1x real-time framerate may vary depending on the source video. For example, film contents may be recorded at 24 frames per second, whereas broadcast contents may be recorded at 30 or 60 frames per second, and broadcasts for other locations such as Europe may utilize alternative values such as 25 or 50 frames per second. Regardless of the particular framerate used, a viewer will perceive all contents as being played at a normal 1x real-time playback rate, although higher framerates may present smoother motion.

Additionally or alternatively, processor 261 may use other factors such as playback history 264 to select an available temporal window. Playback history 264 may contain, for example, previous states of playback speed mode 263, or information regarding previously accessed contents. For example, playback history 264 might indicate that whenever an advertisement shows, the user almost always changes playback speed mode 263 to fast-forward at 2x real-time speed. In this case, rather than waiting for user input, processor 261 might preemptively select content 241e corresponding to temporal window 262b suitable for a playback speed mode of 2x real-time speed, since playback history 264 indicates that the user almost always selects 2x real-time speed anyway. In this manner, advertising content can still be served to the user, and the user is spared the hassle of having to manually set the fast-forward mode. In effect, the user and the advertiser have agreed to a mutually agreeable 15 seconds advertising run time. This may help to facilitate new advertising income streams, as advertisers can pay less for shorter advertisements and only pay when advertisements are actually watched, rather than merely hoping that users do not use the circumvention facilities of their playback devices.

Although information regarding past playback speeds can be used to estimate user preferences in regards to preferred alternative video content, explicit preferences may also be recorded and utilized by processor 261. For example, playback history 264 may additionally contain various user-defined preferences that are directly provided by the user through input device 265. For example, the user may be presented with an options window prior to content playback, allowing the selection of genres for alternative content playback. This way, the user can directly solicit the types of advertisements selected to be most relevant and interesting for the user, increasing the chances that the user will pay attention to the advertisements. Additionally, the user might also be able to select from different advertising patterns that suit the user's personality. For example, the user might be given a choice between more frequent interruptions with shorter advertising blocks, or less frequent interruptions with more lengthy advertising blocks. If users are able to choose between different advertising patterns according to individual preference, they may feel more in control and less inclined to avoid advertising, since it is presented on their own selected terms.

Additionally, while this may be ultimately to the discretion of player hardware manufacturers, additional mechanisms for ensuring the unaltered delivery of advertisements might also be enforced. For example, once a user has settled on a particular playback speed mode 263 and therefore a corresponding advertising content from advertisement container 240d has begun playing, playback device 260 might block or disable functions of input device 265 that circumvent normal playback by altering playback speeds or bypassing contents entirely. Thus, whereas the user might still be able to use buttons 266a-266b to pause and resume, buttons 266c-266d for fast-forward and rewind may be disabled or may merely switch between different alternative advertising contents rather than changing the playback speed of advertisement contents, and button 266f for skipping forward to the next segment may be disabled to prevent skipping of advertisements.

Furthermore, if the user pushes button 266b to put playback device 260 in a pause mode by changing playback speed mode 263 to pause, playback device 260 may create a new temporal window to serve alternative contents while playback device 260 remains in the pause mode. Since the new temporal window is of an unknown length as the user may push button 266b at any time to resume playback at the previous playback speed mode, playback device 260 may implement a range of different behaviors to fill the new temporal window for a potentially unbounded period of time. For example, a single content video may be looped forever or a group of multiple content videos may be looped in a round robin fashion. Alternatively, one or more content videos may playback immediately or after a delay, and playback device 260 may then revert to a standard pause mode. In this manner, alternative content such as advertising content may be served during pause intervals initiated by the user.

While so far selecting video contents has focused primarily on the current or past states of playback speed mode 263 as manipulated by a user through input device 265, which in a way acts as a proxy for the user's pleasure or displeasure upon seeing particular video contents, other supplementary information may be used as well. For example, playback history 264 could also contain a log of reactions to advertisements sorted by subject matter. Playback history 264 might indicate, for example, that the user is willing to watch the full 30 second versions of advertisements related to food, but quickly uses button 266*d* to select shorter 15 or 7.5 second versions of advertisements related to cars or clothes. Processor 261 might then use this information within playback history 264 to serve advertisements or other content that is more relevant for the user.

Since playback history 264 in the example above makes food highly relevant to the user compared to other subject matter, if alternative contents container 240*a* is accessed for streaming to playback device 260, processor 261 may favor displaying content 241*a*, related to a subject matter of food, rather than content 241*b* related to cars or content 241*c* related to clothes. Playback history 264 might also contain a log of accessed programs, and might indicate that the user tends to seek and watch cooking shows. This information may further help processor 261 to decide on content 241*a*, since it is related to food, rather than the alternatives. If, on the other hand, playback history 264 indicates the user tends to watch racing shows, then content 241*b* related to cars might be selected instead. Weighting algorithms, user surveys, and other information might also be used to provide more relevant content for the user.

Figure 3:
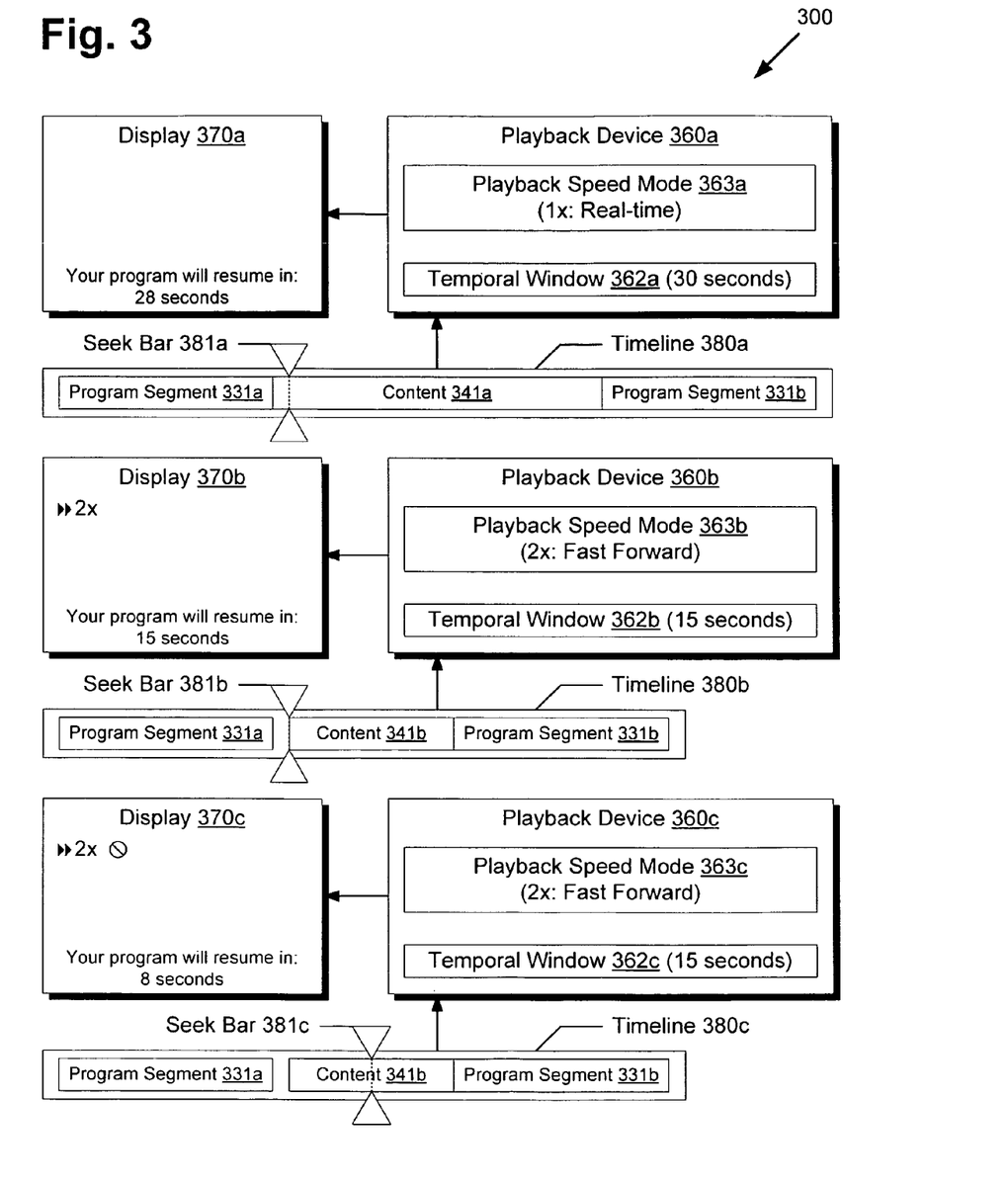
FIG. 3 presents a series of exemplary interfaces on a display of a playback device using a system for providing time-adapted video content during trick mode playback, according to one embodiment of the present invention.

FIG. 3 presents a series of exemplary interfaces on a display of a playback device using a system for providing time-adapted video content during trick mode playback, according to one embodiment of the present invention. Diagram 300 of FIG. 3 includes playback devices 360*a*-360*c*, displays 370*a*-370*c*, timelines 380*a*-380*c*, and seek bars 381*a*-381*c*. Playback device 360*a* includes playback speed mode 363*a* and temporal window 362*a*. Playback device 360*b* includes playback speed mode 363*b* and temporal window 362*b*. Playback device 360*c* includes playback speed mode 363*c* and temporal window 362*c*. Timeline 380*a* includes program segment 331*a*, content 341*a*, and program segment 331*b*. Timeline 380*b* includes program segment 331*a*, content 341*b*, and program segment 331*b*. Timeline 380*c* includes program segment 331*a*, content 341*b*, and program segment 331*b*. With regards to FIG. 3, it should be noted that program segments 331*a*-331*b* correspond to program segments 131*a*-131*b* from FIG. 1 respectively, that contents 341*a*-341*b* correspond to contents 241*d*-241*e* from FIG. 2 respectively, that playback devices 360*a*-360*c* correspond to playback device 260, and that displays 370*a*-370*c* correspond to display 270.

Diagram 300 of FIG. 3 presents three sets of exemplary interfaces shown by displays 370*a*-370*c*, which represent the progress of video playback as indicated by seek bars 381*a*-381*c* on timelines 380*a*-380*c*, respectively. As shown by seek bar 381*a*, display 370*a* is currently showing slightly past the beginning of content 341*a*. Since program segment 331*a* just finished showing, playback device 360*a* has moved on to content 341*a*, which might comprise a 30 second advertisement. Since at the time of seek bar 381*a*, no user input may have been detected, a default normal 1x real-time speed mode might be maintained, as shown by playback speed mode 363*a*. Thus, temporal window 362*a* is set to 30 seconds, and content 341*a* is selected for showing on display 370*a*. Additionally, as shown by the subtitle "Your program will resume in: 28 seconds," playback device 360*a* also renders an interface on display 370*a* indicating an amount of playback time remaining for content 341*a*.

Assuming that a user of playback device 360*a* pushed a fast-forward button on an associated input device, display 370*a* may transition to display 370*b*, playback device 360*a* may transition to the state of playback device 360*b*, and timeline 380*a* may change to timeline 380*b*. Since the user manually initiated a fast-forward operation, playback speed mode 363*a* transitions from 1x real-time to 2x real-time fast-forward, as shown by playback speed mode 363*b*. Additionally, the available temporal window shrinks to temporal window 362*b*, which is only 15 seconds long. Thus, content 341*b* may substitute for content 341*a*, as shown in timeline 380*b*. Display 370*b* is correspondingly updated, with an indicator in the upper-right reflecting playback speed mode 363*b* and the remaining time indicator at the bottom updated to reflect the newly selected content 341*b*. However, as previously discussed, the video displaying on display 370*b* will actually playback at a standard 1x real-time speed, even though playback device 360*b* is in a fast-forward playback mode. Thus, to prevent confusion, the remaining time indicator is shown at the bottom of display 370*b* to indicate to the user that playback device 360*b* is showing alternative contents at 1x real-time speed, rather than showing contents at a fast-forward 2x real-time speed. Also, the original content 341*a* might be shown concurrently in a picture-in-picture (PIP) window to give further visual indication that content replacement is occurring and that the playback device is operating normally as specified within the selected playback speed mode.

Now turning to examine timeline 380*c* and display 370*c*, it should be clear that between seek bar 381*b* and seek bar 381*c* a full 7 seconds has elapsed, rather than a 2x fast-forwarded 3.5 seconds, since regardless of playback speed modes 363*a*-363*c*, the video shown on display 370*a*-370*c* is played at 1x real-time speed when alternative contents are chosen to replace contents in timeline 380*a*-380*c*. Thus, judging by the remaining time subtitles between the interfaces of displays 370*b* and 370*c*, 15-8 or 7 seconds must have elapsed in between. Additionally, assuming the user attempted to fast-forward or skip content 341*b*, then the blocking icon shown next to the speed indicator to the upper-left of display 370*c* may signify to the user that such functions are currently blocked, and that the user has no choice but to watch the remainder of content 341*b* before program segment 331*b* resumes playback. Of course, as previously discussed, this blocking functionality may be implemented or removed at discretion.

Additionally, video content substitution may span across multiple temporal windows in aggregate. For example, instead of just a single temporal window between program segments 331*a* and 331*b*, there may be two temporal windows or segment temporal windows for two content segments, for example if two commercials or advertisements are to be scheduled sequentially between programming segments. In this case, timeline 380*a* may schedule 60 seconds for two instances of temporal window 362*a*, rather than 30 seconds for a single temporal window 362*a*. After the user transitions from 1x real-time speed to 2x fast-forward speed, playback device 360*a* having two instances of temporal window 362*a* at 30 seconds each may transition to playback device 360*b* having one instance of temporal window 362*a* at 30 seconds, rather than two instances of temporal window 362*b* at 15 seconds each. In this manner, content substitution can still choose from alternative video content with 30 second playback times, rather than being limited to 15 second playback times.

This substitution across aggregate temporal windows may be particularly helpful where temporal windows are very short, leaving little time to convey a cohesive message. For example, an advertising block of four 30 second temporal windows may be reserved between programming segments, but a user of the playback device may have selected a double fast-forward playback mode or a 4x real-time speed mode, effectively reducing the 30 second temporal windows to 7.5 seconds each. Rather than being presented with four consecutive 7.5 second advertising segments, a single unified 30 second advertising segment or two 15 second advertising segments may be presented instead, which may more effectively engage the viewer's attention and maintain the integrity of the advertiser's messages.

In this manner, the interests of users in watching content with as few or at least as interesting as possible interruptions is balanced against the interests of advertisers in having their messages effectively heard and viewed, facilitating the future viability of advertisement based sponsorship of video content. While advertisements may be the most practical application of time-adapted video content during trick mode playback, other supplemental content could conceivably be used as well, such as special alternative segments for enhanced user experiences during trick playback of DVD or Blu-ray programs.

Figure 4:
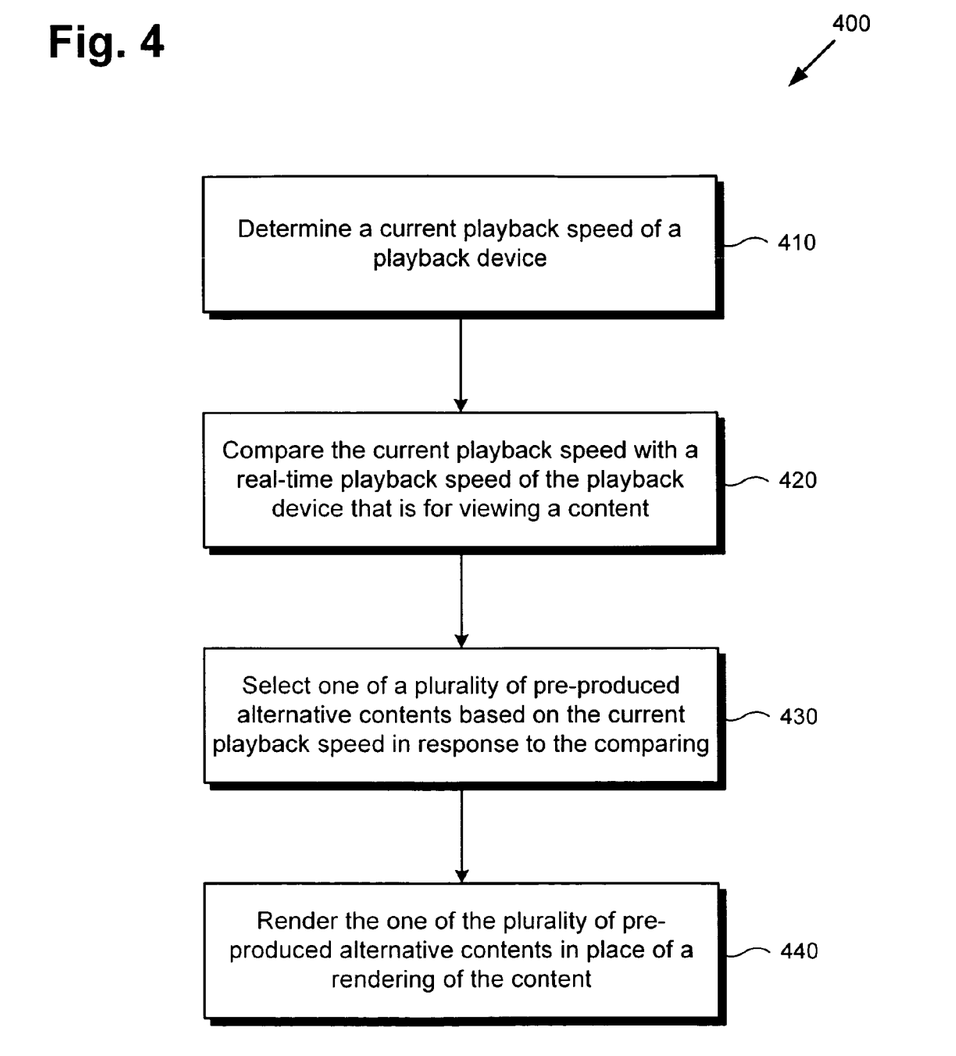
FIG. 4 shows a flowchart describing the steps, according to one embodiment of the present invention, by which a playback device can provide time-adapted video contents during trick mode playback.

FIG. 4 shows a flowchart describing the steps, according to one embodiment of the present invention, by which a playback device can provide time-adapted video contents during trick mode playback. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and diagram 300 of FIG. 3, step 410 of flowchart 400 comprises playback device 360b determining playback speed mode 363b. As shown in FIG. 3, playback speed mode 363b is 2x real-time fast-forward. Playback speed mode 363b may have reached this state due to a user providing user input from an input device in communication with playback device 360b.

Referring to step 420 of flowchart 400 in FIG. 4 and diagram 300 of FIG. 3, step 420 of flowchart 400 comprises playback device 360b comparing playback speed mode 363b determined from step 410 with a real-time playback speed of playback device 360b that is for viewing content 341a. Comparing playback speed mode 363b with playback speed mode 363a, it can be seen that playback speed mode 363b is 2x or twice as fast as the real-time playback speed for content 341a.

Referring to step 430 of flowchart 400 in FIG. 4 and environment 100 of FIG. 1, step 430 of flowchart 400 comprises playback device 160 selecting content 341b based on playback speed mode 363b determined in step 410 and the comparing in step 420. In other words, since the current playback speed is double that of the real-time speed as ascertained in step 420, the available temporal window is halved from the default of content 141a corresponding to contents for real-time playback, reducing from 30 seconds for 1x real-time to 15 seconds for 2x real-time. As a result, content 141b is selected out of the alternatives shown in advertisement container 140a, which corresponds to content 341b of FIG. 3. As a result, from the previous timeline 380a to the present timeline 380b, content 341b substitutes for the previous content 341a.

Referring to step 440 of flowchart 400 in FIG. 4 and diagram 300 of FIG. 3, step 440 of flowchart 400 comprises playback device 360b rendering content 341b selected from step 430 in place of rendering content 341a. As shown by display 370b, playback device 360b has switched from outputting content 341a to outputting content 341b for display 370b. In this manner, time-adapted video contents can be provided during trick-mode playback. This can be utilized to obtain new potential advertising revenue for video content or to provide supplemental or alternative video features to enhance the viewing experience for users.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of providing a plurality of pre-produced alternative video contents for rendering by a playback device following a rendering of a video content, each of the pre-produced alternative video contents having an associated temporal window, the method comprising:
   determining a first temporal window for rendering one of the plurality of pre-produced alternative video contents following the rendering of the video content, wherein the first temporal window is automatically determined based on a history of playback speeds previously selected by a user of the playback device following the rendering of the video content, wherein the first temporal window is shorter than a second temporal window when the playback device is operating in a normal 1x real-time speed, and wherein the first temporal window corresponds to a current playback mode length of the playback device;
   selecting one of the plurality of pre-produced alternative video contents having the associated temporal window matching the first temporal window; and
   rendering the one of the plurality of pre-produced alternative video contents at the normal 1x real-time speed within the first temporal window.

2. The method of claim 1 further comprising:
   resuming the rendering of the video content after the rendering of the one of the plurality of pre-produced alternative video contents.

3. The method of claim 1, wherein, the method further comprises:
   blocking playback functions of the playback device altering a playback speed, playback mode or bypassing the rendering the one of the plurality of pre-produced alternative video contents.

4. The method of claim 1, wherein the playback device has a plurality of playback modes including a rewind mode, a fast-forward mode, a pause mode and a real-time mode, and wherein the playback device is in the fast-forward mode.

5. The method of claim 1, wherein the playback device has a plurality of playback modes including a rewind mode, a fast-forward mode, a pause mode and a real-time mode, and wherein the playback device is in the rewind mode.

6. The method of claim 1 further comprising providing the plurality of pre-produced alternative video contents from separate tracks within the video content.

7. The method of claim 1 further comprising providing the plurality of pre-produced alternative video contents from a source different than the video content.

8. The method of claim 7, wherein the source different than the source of the video content comprises a network source.

9. The method of claim 7, wherein the source different than the source of the video content comprises a local storage source.

10. The method of claim 1, wherein the rendering the one of the plurality of pre-produced alternative contents further comprises rendering an interface indicating an amount of playback time remaining for the one of the plurality of pre-produced alternative contents.

11. The method of claim 1, wherein the selecting of the one of the plurality of pre-produced alternative video contents is further based on a history of selected subject matter.

12. The method of claim 1, wherein the selecting of the one of the plurality of pre-produced alternative video contents is further based on user defined preferences.

13. The method of claim 1, wherein the rendering of the one of the plurality of pre-produced alternative video contents further comprises rendering an interface indicating an amount of playback time remaining for the one of the plurality of pre-produced alternative video contents.

14. The method of claim 1, wherein the rendering of the one of the plurality of pre-produced alternative video contents further comprises rendering an interface displaying the rendering of the video contents concurrently within a picture-in-picture (PIP) window.

15. The method of claim 1, wherein a subject matter of the one of the plurality of pre-produced alternative video contents is independent of the video content.

16. A playback device for providing a plurality of pre-produced alternative video contents following a rendering of a video content, each of the pre-produced alternative video contents having an associated temporal window, the playback device comprising:

a processor configured to:
    determine a first temporal window for rendering one of the plurality of pre-produced alternative video contents following the rendering of the video content, wherein the first temporal window is automatically determined based on a history of playback speeds previously selected by a user of the playback device following the rendering of the video content, wherein the first temporal window is shorter than a second temporal window when the playback device is operating in a normal 1x real-time speed, and wherein the first temporal window corresponds to a current playback mode length of the playback device;
    select one of the plurality of pre-produced alternative video contents having the associated temporal window matching the first temporal window; and
    render the one of the plurality of pre-produced alternative video contents at the normal 1x real-time speed within the determined temporal window.

17. The playback device of claim 16, wherein the processor is further configured to resume the rendering of the video content after the rendering of the one of the plurality of pre-produced alternative video contents.

18. The playback device of claim 16, wherein the processor is further configured to block playback functions of the playback device altering a playback speed, playback mode or bypassing the rendering the one of the plurality of pre-produced alternative video contents.

19. The playback device of claim 16, wherein the playback device has a plurality of playback modes including a rewind mode, a fast-forward mode, a pause mode and a real-time mode, and wherein the playback device is in the fast-forward mode.

20. The playback device of claim 16, wherein the playback device has a plurality of playback modes including a rewind mode, a fast-forward mode, a pause mode and a real-time mode, and wherein the playback device is in the rewind mode.

* * * * *